(12) United States Patent
Aldino et al.

(10) Patent No.: US 10,744,735 B2
(45) Date of Patent: Aug. 18, 2020

(54) COMPOSITE MATERIALS AND USES THEREOF

(75) Inventors: Albertelli Aldino, London (GB); Michael Frieh, London (GB)

(73) Assignee: Acell Industries Limited, London (GB)

( * ) Notice: Subject to any disclaimer, the term of this patent is extended or adjusted under 35 U.S.C. 154(b) by 138 days.

(21) Appl. No.: 14/123,696

(22) PCT Filed: Jun. 1, 2012

(86) PCT No.: PCT/GB2012/051256
§ 371 (c)(1),
(2), (4) Date: Jul. 30, 2014

(87) PCT Pub. No.: WO2012/164310
PCT Pub. Date: Dec. 6, 2012

(65) Prior Publication Data
US 2014/0335314 A1   Nov. 13, 2014

(30) Foreign Application Priority Data

Jun. 3, 2011  (GB) .................................. 1109356.4

(51) Int. Cl.
*B32B 5/18*    (2006.01)
*B32B 3/26*    (2006.01)
(Continued)

(52) U.S. Cl.
CPC ............... *B32B 3/263* (2013.01); *B32B 5/18* (2013.01); *B32B 27/065* (2013.01); *E04C 2/205* (2013.01);
(Continued)

(58) Field of Classification Search
CPC ......... B32B 27/065; B32B 3/263; B32B 5/18; B32B 2266/06; B32B 2307/304;
(Continued)

(56) References Cited

U.S. PATENT DOCUMENTS 4,042,746 A * 8/1977 Hofer .................. B29C 44/5618
156/295
4,722,770 A * 2/1988 Blottiere .................. C25D 1/02
205/73

(Continued)

FOREIGN PATENT DOCUMENTS

DE          1965272 A1    7/1971
DE     2007 056 837 A1    5/2009  ............ F16L 59/065
(Continued)

OTHER PUBLICATIONS

International Search Report dated Jan. 8, 2013, in Application Serial No. PCT/GB2012/051256.
(Continued)

*Primary Examiner* — Joanna Pleszczynska
(74) *Attorney, Agent, or Firm* — Ryan T. Grace; Advent, LLP

(57) ABSTRACT

The invention is directed to composite material panels, comprising insulating layers comprising a solid open-cell foam panel, which may comprise at least one internal void therein, and wherein one or more surfaces of the panel are provided with an air-tight sealing coating.

25 Claims, 9 Drawing Sheets

Figure 1:
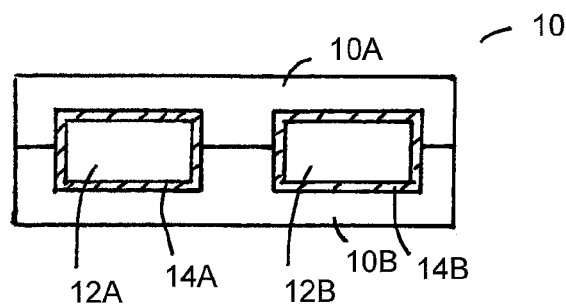

(51) Int. Cl.
*B32B 27/06* (2006.01)
*E04C 2/02* (2006.01)
*F16L 59/065* (2006.01)
*E04C 2/20* (2006.01)

(52) U.S. Cl.
CPC ....... *F16L 59/065* (2013.01); *B32B 2255/102* (2013.01); *B32B 2266/06* (2013.01); *B32B 2307/304* (2013.01); *Y10T 156/10* (2015.01); *Y10T 428/24504* (2015.01)

(58) Field of Classification Search
CPC ... B32B 2255/102; E04B 1/803; E04B 1/806; Y10T 428/233; Y10T 428/24339; Y10T 428/24504; Y10T 428/249953; Y10T 428/249978; E04C 2/205
USPC .................. 428/69, 159, 315.5; 52/794.1
See application file for complete search history.

(56) References Cited

U.S. PATENT DOCUMENTS

| | | | | |
|---|---|---|---|---|
| 6,322,869 B1* | 11/2001 | Dietrich | ................ | F16L 59/065 428/69 |
| 6,623,413 B1* | 9/2003 | Wynne | ................ | B29C 44/1266 493/101 |
| 8,798,298 B1* | 8/2014 | Burns | ................ | H04R 1/2876 264/267 |
| 2006/0182877 A1* | 8/2006 | Creasy | ................ | H05K 9/0084 427/96.3 |
| 2007/0256379 A1* | 11/2007 | Edwards | ................ | B32B 5/18 52/309.9 |
| 2009/0031659 A1* | 2/2009 | Kalfon | ................ | E04B 1/803 52/404.1 |

FOREIGN PATENT DOCUMENTS

| | | | | |
|---|---|---|---|---|
| DE | 102007056837 A1 | 5/2009 | | |
| WO | 96/03265 | 2/1996 | ............ | B29C 44/02 |
| WO | 99/36636 | 7/1999 | ............ | E04B 1/80 |
| WO | 2006/120183 A1 | 11/2006 | ............ | E04B 1/78 |
| WO | 2006120183 A1 | 11/2006 | | |
| WO | 2007/091796 A1 | 8/2007 | ............ | E04B 1/80 |
| WO | 2011/016961 A2 | 2/2011 | ............ | C08J 9/36 |

OTHER PUBLICATIONS

Search Report Under Section 17(5) dated Oct. 3, 2011, in Application Serial No. GB1109356.4.

* cited by examiner

COMPOSITE MATERIALS AND USES THEREOF

This invention relates to composite materials. In particular, the invention relates to composite materials which are useful as thermal insulating materials. Aspects of the invention relate to composite materials having a layered structure, wherein at least one layer comprises a solid open-cell foam having an airtight coating. Other aspects of the invention relate to composite materials comprising at least one open-cell foam layer having voids therein, wherein the voids are preferably provided within an airtight coating.

The composite materials of the invention may be used to insulate a wide variety of heated or refrigerated enclosures. For example, they may be used as building materials, as components of vehicles, or as components of electrical appliances. The invention also relates to methods of producing the novel composite materials, as well as to products comprising the composite materials.

Insulating materials are used in a wide variety of applications where it is desired to limit the transfer of heat from one area to another. In particular, insulating materials find wide application in the construction of buildings (e.g. walls, windows and doors), and in the manufacture of refrigerated/heated apparatus, such as refrigerators, refrigerated vehicles and hot water tanks.

Many insulating materials comprise foams or fibrous materials. Foam insulation materials, such as polyurethane foams, are commonly supplied as extruded boards, but may be formed in situ in some applications, e.g. cavity wall insulation. Fibrous insulation materials include fibreglass, loose fill-cellulose (generally finely divided newsprint) and cotton fibre or wood fibre blankets.

These materials reduce heat transfer by restricting airflow, thereby limiting convective heat transfer. Conductive heat transfer is also limited by the low thermal conductivity and low density of the materials commonly employed.

Closed-cell foams are more commonly used as insulating materials tha solid open-cell foams. Solid open-cell foams have the disadvantage that they do not completely restrict airflow through the foam, thus reducing the insulating effectiveness of solid open-cell foams relative to closed-cell foams. Solid open-cell foams also allow the passage of moisture which may be disadvantageous in some applications.

Evacuated insulation panels having reduced internal pressure are known for various uses, such as building insulation and for refrigerated enclosures, for example domestic refrigerators, cold rooms and refrigerated vehicles. Such evacuated insulation panels generally comprise a low thermal conductivity filler material and a gastight film enveloping the filler. The interior of the gastight film is evacuated to low pressure, for example around 500 kPa, and the film is hermetically sealed. Known filler materials include finely divided inorganic powders, such as silica, alumina and fibreglass. It has also been proposed to use organic foamed materials as the core material in evacuated insulation panels. For example, US 2008/0199678 discloses a vacuum insulation panel comprising a solid open-celled polyurethane foam packed in a gas tight film envelope, wherein the gas tight film envelope is evacuated and subsequently welded so as to be airtight. Suitable materials for forming the gas tight film envelope include composite films, such as polyester films having a deposited or laminated layer of aluminium. Similar types of vacuum insulation panels are also known from WO 99/36636.

WO 2007/091796 discloses another form of vacuum insulation panel in which two corrugated panels are disposed either side of a planar intermediate panel, wherein each of corrugated panels is disposed such that its corrugations run perpendicular to the corrugations on the opposite panel, thus minimising the contact points between the layers. The voids between the corrugations and the intermediate panel are evacuated and sealed so as to form a series of vacuum chambers within the insulation panel.

The present invention augments the range of insulation techniques available in the art by providing novel and highly effective insulation materials, such as insulating panels.

In a first aspect the present invention provides a composite material panel comprising a first insulating layer comprising a solid open-cell foam panel having at least one internal void provided therein, wherein the peripheral surfaces of the internal void are provided with an air-tight sealing coating.

As used herein, the term "internal void" is used to refer to a fully enclosed cavity or chamber within the solid open-cell foam panel. The term should not be considered to refer to the cells of the solid open-cell foam panel, but to a distinct void space within the internal structure of the foam panel which provides a thermal break, i.e. a discontinuity in the thermal conductivity of the panel. The air-tight sealing coating is provided over the peripheral surfaces of the or each internal void so as to hermetically seal the interior of the internal void.

In preferred embodiments, the solid open-cell foam panel has a plurality of internal voids provided therein. Preferably, the solid open-cell foam panel comprises a plurality of voids distributed in a two-dimensional array in the direction perpendicular to the panel thickness.

In principle, it is possible to use all previously described solid open-cell foam materials to form the composite material panels of the invention. However, in aspects of the invention the solid open-cell foam is preferably a substantially rigid, self-supporting polymeric foam which is resistant to deflection under load and does not collapse under moderate pressure. For example, the polymeric foam may be selected from phenolic resin foams, polystyrene foams, polyurethane foams, polyethylene foams, polyvinylchloride foams, polyvinylacetate foams, polyester foams polyether foams, and foam rubber. Preferably, the polymeric foam is selected from phenolic resin foams.

The solid open-cell foam may include a finely-divided particulate reinforcing material. Suitable particulate reinforcing materials are preferably inert and insoluble. The reinforcing material may be present in an amount of up to 10 weight percent based on the total weight of the foam, for example from 2 to 10 weight percent, or 5 to 10 weight percent based on the total weight of the foam. Suitable reinforcing materials include organic or inorganic (including metallic) particulate materials, which may be crystalline or amorphous. Even fibrous solids have been found to be effective, although not preferred. Non-limiting examples of suitable particulate materials include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Preferably the solid open-cell foam has a density in the range of 100 to 500 kg·m$^{-3}$, more preferably 120 to 400 kg·m$^{-3}$, and most preferably 120 to 250 kg·m$^{-3}$.

The physical properties of such foams, especially the compressive strength and deflection under load are believed to be related to (amongst other factors) cell wall thickness and average cell diameter. Preferably, the average cell diameter of the solid open-cell foam is in the range of about 0.5 mm to 5 mm, more preferably 0.5 or 1 mm to 2 or 3 mm.

The cells or pores of the solid open-cell foam are open to the surface of the internal void onto which the air-tight sealing coating is applied, and preferably they open out below the surface to a greater width than the opening, thereby providing an undercut which can enhance the keying of the air-tight sealing material to the open-cell foam.

The air-tight sealing coating is provided over the peripheral surfaces of each internal void so as to hermetically seal the interior of the internal void.

The interior of each internal void is preferably evacuated so as to form a partial vacuum within the internal void. For instance, the internal void may desirably have an internal pressure of from 10,000 to 95,000 kPa, for example 20,000 to 80,000 kPa.

Each internal void may contain air or an inert gas, either at or around atmospheric pressure, or under a partial vacuum as described above. Examples of inert gases which may be introduced into the internal voids include nitrogen, helium, neon, argon, krypton and xenon. Preferably, the inert gas is nitrogen.

It is also envisioned that other materials, preferably gaseous materials, could be introduced into the internal voids, for instance fire retardants such as haloalkane gases (known as halons).

The air-tight sealing coating preferably comprises or consists of one or more elastomers. Preferably, the air-tight sealing coating comprises or consists of at least one elastomer selected from: natural rubber, synthetic polyisoprene, butyl rubber, halogenated butyl rubber, polybutadiene, styrene-butadiene rubber, nitrile rubber, hydrogenated nitrile rubber, chloroprene rubber, silicone rubber, and halogenated silicone rubber.

The air-tight sealing coating preferably penetrates at least a portion of the solid open-cell foam around the periphery of the internal void. For example, the air-tight sealing coating may penetrate the solid open-cell foam to a depth which is at least equivalent to the average cell diameter of the foam, more preferably to a depth which is at least two times the average cell diameter of the foam. Alternatively, the air-tight sealing coating may penetrate the solid open-cell foam to a depth of at least 0.5 mm, more preferably at least 1.0 mm, and still more preferably at least 2.0 mm, for example at least 2.5 mm or at least 3.0 mm.

In accordance with preferred embodiments of the invention, the solid open-cell foam panel has a thickness of from 1 to 50 cm, more preferably from 2 to 40 cm. In further preferred embodiments, the solid open-cell foam panel of the invention may have a thickness of from 2 to 5 cm, from 5 to 10 cm, from 10 to 20 cm, from 20 to 30 cm, or from 30 to 40 cm.

The length and width of the solid open-cell foam panel are not particularly limited and may each take a range of values, for instance in the range of from 20 to 10,000 cm, for example from 50 to 5,000 cm. Multiplying the length by the width provides the surface area of the solid open-cell foam panel, which as used herein refers to the surface area of a single face of the solid open-cell foam panel.

It will be appreciated that the size of the composite material panel will depend on the end use of the panel. In general panels having greater length and width will also have greater thickness so as to maintain a functional level of rigidity of the panel.

In accordance with this aspect of the present invention, each internal void preferably has an average depth in the panel thickness direction of from 10% to 90% of the solid open-cell foam panel thickness, more preferably from 20% to 80% of the solid open-cell foam panel thickness, and still more preferably from 30% to 70% of the solid open-cell foam panel thickness. In further preferred embodiments, each internal void may have an average depth in the panel thickness direction of from 30% to 40% of the solid open-cell foam panel thickness, from 40% to 50% of the solid open-cell foam panel thickness, from 50% to 60% of the solid open-cell foam panel thickness, or from 60% to 70% of the solid open-cell foam panel thickness.

The cross-sectional area of each internal void in the direction perpendicular to the panel thickness is not particularly limited and may be varied by the skilled person to take account of the degree of thermal insulation required and the structural performance required of the panel. Merely for example, the cross-sectional area of each void may be from as little as 1.0 cm$^2$ to as much as 10,000 cm$^2$. In preferred embodiments, the cross-sectional area of each void may be from 5.0 cm$^2$ to 5,000 cm$^2$, for example from 10 cm$^2$ 15 to 2,500 cm$^2$, from 20 cm$^2$ to 1,000 cm$^2$ or from 50 cm$^2$ to 500 cm$^2$. It will be appreciated that voids having a larger cross-sectional area in the direction perpendicular to the panel thickness are more appropriate as the thickness of the panel is increased.

The total cross-sectional area of all internal voids in the solid open-cell foam panel in the direction perpendicular to the panel thickness is not particularly limited. It will be appreciated by the skilled person that as the total area of the internal voids is decreased relative to the total surface area of the panel, the thermal insulating properties of the panel are also decreased. However, increasing the total area of the internal voids relative to the total surface area of the panel may reduce the compression strength and rigidity of the panel. This effect can be mitigated in some cases by dividing the total area of the internal voids over a large number of voids each having a small area rather than a smaller number of internal voids each having a large area.

In preferred embodiments of the invention, the total area of the internal voids may be from 5% to 90% of the surface area of the solid open-cell foam panel, more preferably from 10 to 80% of the total surface area of the solid open-cell foam panel. In particularly preferred embodiments, the total area of the internal voids is from 40% to 80% of the surface area of the solid open-cell foam panel, for example from 40% to 50%, from 50% to 60%, from 60% to 70% or from 70% to 80% of the surface area of the solid open-cell foam panel.

If required, the internal voids may contain reinforcing structures to maintain the strength and rigidity of the panels and/or to maintain the shape of the internal voids (e.g. where the internal voids are under partial vacuum). Suitable reinforcing structures may include reinforcing bars or posts which may, for instance, be formed from metal or from a solid-open-cell foam material. It will be appreciated that a reinforcing bar extending across an entire internal void may subdivide the void into separate portions. Such a subdivided void is within the scope of the present invention. Where a reinforcing bar or post is formed from a solid open-cell foam, it is not necessary that the reinforcing bar or post itself be provided with an air-tight sealing coating, provided that the peripheral surfaces of the internal void surrounding the reinforcing bar or post are provided with an air-tight sealing coating.

In accordance with this aspect of the invention, the composite material panel may comprise one or more additional layers associated with the solid open-cell foam panel.

In preferred embodiments, the composite material panels of the invention may comprise one or more additional foam layers. The additional foam layer(s) may comprise an open cell foam layer, for instance using the open cell foams described above, or a layer of a closed cell foam such as are well-known in the art. In a preferred embodiment, the composite material panel may comprise an additional solid open-cell foam panel having at least one internal void provided therein, as described above.

In further preferred embodiments, the composite material panels of the invention may comprise a layer of a sheet-form polymeric material. As used herein, the term "sheet-form polymeric material" is preferably used to refer to a sheet-form curable material.

Preferably, the sheet-form polymeric material comprises a thermosetting polymer resin matrix, for example, a thermosetting polymer resin matrix selected from polyester resins, vinyl ester resins, epoxy resins, phenolic resins, bismaleimide resins or polyimide resins. Most preferably, the sheet-form polymeric material comprises a thermosetting polymer resin selected from polyester resins. The sheet-form polymeric material may also include melamine, which is useful as a fire retardant. The sheet-form polymeric material may further include additives selected from hardeners, accelerators, fillers, pigments, and/or any other components as required. The matrix may include a thermoplastic material.

The sheet-form polymeric material may comprise reinforcement, for example reinforcing fibres. The fibres may include one or more materials. For example the fibres may include one or more of carbon fibres, glass fibres, aramid fibres and/or polyethylene fibres. Preferably, the reinforcement comprises or consists of glass fibres.

The reinforcing fibres may be short fibres, for example having lengths of 5.0 cm or less, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. Fibres may provide a continuous filament winding. Optionally, more than one layer of fibres may be provided.

Preferably the layer of sheet-form polymeric material comprises SMC (sheet moulding compound). The SMC preferably includes a thermosetting polymer matrix as defined above and reinforcing fibres also as defined above. For example, the SMC may include a thermosetting resin, for example a polyester resin, together with reinforcing fibres, for example glass fibres. The thermosetting polymer may further comprise additives, for example minerals, inert fillers, pigments, stabilizers, inhibitors, release agents, catalysts, thickeners, hydrating additives and/or other suitable materials.

There are benefits in using SMC. For example, SMC has low density but favourable mechanical properties compared with other sheet-form polymeric materials, and also exhibits good thermal properties. Of particular importance for some applications, for example building applications, resistance to fire is good. SMC also shows good chemical resistance.

In preferred embodiments, the composite material panels of the invention may comprise a thermally insulating core comprising a solid open-cell foam panel as defined above and optionally one or more additional foam layers, wherein the core is sandwiched between first and second layers of sheet-form polymeric material. The first and second layers of sheet-form polymeric material may be the same or different. Preferably, the first and second layers of sheet-form polymeric material comprise a thermosetting polymer matrix as defined above, and optionally reinforcement as defined above. For example, the first and second layers of sheet-form polymeric material may comprise SMC as defined above. Thus, in one embodiment, the invention relates to a layered composite material panel wherein an insulating core comprising a solid open-cell foam panel as defined above is sandwiched between outer layers of sheet-form polymeric material, for example SMC.

The composite material panels of the invention may further comprise one or more reinforcing layers to provide additional strength, rigidity and/or weight-bearing capacity to the panels. Thus, alternatively or in addition to reinforcement being provided as an integral part of sheet-form polymeric material, reinforcement may be provided as a separate layer, for example arranged between a sheet-form polymeric material layer and the substrate.

Where a separate layer of reinforcement is provided, it may be coextensive with the solid open-cell foam panel, or it may be provided only in certain areas of the layered composite material where reinforcement is required. If there is a particular area of the composite material panel which is more susceptible to damage in use, then additional reinforcement can be provided in that area, for example at the edges and/or at the corners of the composite material panel.

In accordance with this aspect of the invention, the composite material panels may further comprise one or more fire retardant layers. Examples of materials which may be incorporated into the one or more fire retardant layers include rock wool, gypsum, perlite, vermiculite, alumina, aluminium hydroxide, magnesium hydroxide, and calcium silicate. The solid open-cell foam panels of this aspect of the invention may be prepared by a method comprising the steps of:
  (i) providing a first solid open-cell foam panel having at least one recess provided in a surface thereof;
  (ii) coating the periphery of the recess with an air-tight sealing coating material, such as an elastomer as described above; and
  (iii) sealing the first solid open-cell foam panel to a second solid open-cell foam panel which is also provided with an air-tight sealing coating so as to form a hermetically sealed internal void at the or each recess.

In accordance with this method, the second solid open-cell foam panel may have at least one recess provided in a surface thereof which is complementary to a recess provided on a surface of the first solid open-cell foam panel.

The solid open-cell foam panels of this aspect of the invention may also be prepared by a method comprising the steps of:
  (i) providing a first solid open-cell foam panel having at least one opening extending through the entire thickness of the panel;
  (ii) coating the periphery of the opening with an air-tight sealing coating material, such as an elastomer as described above; and
  (iii) sandwiching the first solid open-cell foam panel between second and third solid open-cell foam panels, each of which is also provided with an air-tight sealing coating so as to form a hermetically sealed internal void at the or each opening.

In accordance with this method, the second and/or the third solid open-cell foam panel may optionally have at least one recess provided in a surface thereof which is complementary to the opening in the first solid open-cell foam panel.

The solid open-cell foam panels of this aspect of the invention may also be prepared by a method comprising the steps of:
(i) providing a first solid open-cell foam panel;
(ii) bonding rails and stiles of solid open-cell foam on the surface of the first solid open-cell foam panel so as to define at least one recess enclosed by the rails and stiles;
(iii) coating the periphery of the recess with an air-tight sealing coating material, such as an elastomer as described above; and
(iv) sealing a second open-cell foam panel which is also provided with an air-tight sealing coating to the assembly from step (iii) so as to form a hermetically sealed internal void at the or each recess.

In preferred embodiments of the above methods, the material used to form the airtight sealing coating on the periphery of the internal void may also be used to bond the panels and/or the rails and stiles to one another. When used in this way, the air-tight sealing coating preferably penetrates at least a portion of the solid open-cell foam on either side of the bond. For example, the air-tight sealing coating may penetrate the solid open-cell foam to a depth which is at least equivalent to the average cell diameter of the foam, more preferably to a depth which is at least two times the average cell diameter of the foam. Alternatively, the air-tight sealing coating may penetrate the solid open-cell foam to a depth of at least 0.5 mm, more preferably at least 1.0 mm, and still more preferably at least 2.0 mm, for example at least 2.5 mm or at least 3.0 mm.

In a second aspect the present invention provides a composite material panel comprising a first insulating layer comprising a solid open-cell foam panel and at least one layer of a sheet-form polymeric material, wherein an internal void is provided between the solid open-cell foam panel and the at least one layer of sheet-form polymeric material, wherein the surfaces of the open cell foam panel peripheral to the internal void are provided with an air-tight sealing coating, and wherein the sheet-form polymeric material is bonded to the solid open-cell foam panel so as to hermetically seal the internal void.

In accordance with this aspect of the invention, the solid open-cell foam, the sheet-form polymeric material, and the air-tight sealing coating are preferably as described above.

Preferably, an air-tight sealing coating is also provided on the surfaces of the sheet-form polymeric material peripheral to the internal void, such that the air-tight sealing coating forms a hermetic seal over all peripheral surfaces of the internal void.

As above, the term "internal void" is used to refer to a fully enclosed cavity or chamber formed between the solid open-cell foam panel and the at least one layer of a sheet-form polymeric material. The term should not be considered to refer to the cells of the solid open-cell foam panel, but to a distinct void space within the internal structure of the panel which provides a thermal break, i.e. a discontinuity in the thermal conductivity of the panel. A hermetic seal is formed by the airtight sealing coating provided on the surfaces of the open cell foam panel peripheral to the internal void and the sheet-form polymeric material.

In preferred embodiments, plurality of internal voids are provided between the solid open-cell foam panel and the at least one layer of sheet-form polymeric material. Preferably the thermal insulating layer comprises a plurality of voids distributed in a two-dimensional array in the direction perpendicular to the panel thickness.

In accordance with this aspect of the invention, the or each internal void may comprise a recess or depression in a surface of the open-cell foam panel which is hermetically sealed by a layer of sheet-form polymeric material which overlies the recess and is bonded to the surface of the open-cell foam panel at least at the periphery of the recess or depression. The layer of sheet-form polymeric material preferably comprises a thermosetting polymer matrix as defined above, and optionally reinforcement as defined above. For example, the layer of sheet-form polymeric material may comprise SMC as defined above.

In an alternative embodiment, the or each internal void may be formed by providing a first solid open-cell foam panel having at least one opening extending through the entire thickness of the panel, and hermetically sealing the opening by bonding a first layer of sheet-form polymeric material to the surface of the open-cell foam panel on one side of the opening and bonding a second layer of sheet-form polymeric material to the surface of the open-cell foam panel on the opposite side of the opening. The first and second layers of sheet-form polymeric material are each bonded at least to the adjacent periphery of the opening so as to form the internal void. The first and second layers of sheet-form polymeric material may be the same or different. Preferably, the first and second layers of sheet-form polymeric material comprise a thermosetting polymer matrix as defined above, and optionally reinforcement as defined above. For example, the first and second layers of sheet-form polymeric material may comprise SMC as defined above.

The interior of each internal void is preferably evacuated so as to form a partial vacuum within the internal void. For instance, the internal void may desirably have an internal pressure of from 10,000 to 95,000 kPa, for example 20,000 to 80,000 kPa.

Each internal void may contain air or an inert gas, either at or around atmospheric pressure, or under a partial vacuum as described above. Examples of inert gases which may be introduced into the internal voids include nitrogen, helium, neon, argon, krypton and xenon. Preferably, the inert gas is nitrogen.

It is also envisioned that other materials, preferably gaseous materials, could be introduced into the internal voids, for instance fire retardants such as haloalkane gases (known as halons).

The air-tight sealing coating preferably penetrates at least a portion of the solid open-cell foam around the periphery of the internal void. For example, the air-tight sealing coating may penetrate the solid open-cell foam to a depth which is at least equivalent to the average cell diameter of the foam, more preferably to a depth which is at least two times the average cell diameter of the foam. Alternatively, the air-tight sealing coating may penetrate the solid open-cell foam to a depth of at least 0.5 mm, more preferably at least 1.0 mm, and still more preferably at least 2.0 mm, for example at least 2.5 mm or at least 3.0 mm.

In accordance with this aspect of the invention, the solid open-cell foam panel has a thickness of from 1 to 50 cm, more preferably from 2 to 40 cm. In further preferred embodiments, the solid open-cell foam panel of the invention may have a thickness of from 2 to 5 cm, from 5 to 10 cm, from 10 to 20 cm, from 20 to 30 cm, or from 30 to 40 cm.

The length and width of the solid open-cell foam panel are not particularly limited and may each take a range of values, for instance in the range of from 20 to 10,000 cm, for example from 50 to 5,000 cm. Multiplying the length by the width provides the surface area of the panel, which as used herein refers to the surface area of a single face of the panel.

In accordance with this aspect of the present invention, each internal void preferably has an average depth in the panel thickness direction of from 10% to 90% of the solid open-cell foam panel thickness, more preferably from 20% to 80% of the solid open-cell foam panel thickness, and still more preferably from 30% to 70% of the solid open-cell foam panel thickness. In further preferred embodiments, each internal void may have an average depth in the panel thickness direction of from 30% to 40% of the solid open-cell foam panel thickness, from 40% to 50% of the solid open-cell foam panel thickness, from 50% to 60% of the solid open-cell foam panel thickness, or from 60% to 70% of the solid open-cell foam panel thickness.

As above, the cross-sectional area of each internal void in the direction perpendicular to the panel thickness is not particularly limited and may be varied by the skilled person to take account of the degree of thermal insulation required and the structural performance required of the panel. Merely for example, the cross-sectional area of each void may be from as little as 1.0 cm$^2$ to as much as 10,000 cm$^2$. In preferred embodiments, the cross-sectional area of each void may be from 5.0 cm$^2$ to 5,000 cm$^2$, for example from 10 cm$^2$ to 2,500 cm$^2$, from 20 cm$^2$ to 1,000 cm$^2$ or from 50 cm$^2$ to 500 cm$^2$. It will be appreciated that voids having a larger cross-sectional area in the direction perpendicular to the panel thickness are more appropriate as the thickness of the panel is increased.

The total cross-sectional area of all internal voids in the panel in the direction perpendicular to the panel thickness is also not particularly limited. It will be appreciated by the skilled person that as the total area of the internal voids is decreased relative to the total surface area of the panel, the thermal insulating properties of the panel are also decreased. However, increasing the total area of the internal voids relative to the total surface area of the panel may reduce the compression strength and rigidity of the panel. This effect can be mitigated in some cases by dividing the total area of the internal voids over a large number of voids each having a small area rather than a smaller number of internal voids each having a large area.

In preferred embodiments of the invention, the total area of the internal voids may be from 5% to 90% of the surface area of the solid open-cell foam panel, more preferably from 10 to 80% of the total surface area of the solid open-cell foam panel. In particularly preferred embodiments, the total area of the internal voids is from 40% to 80% of the surface area of the solid open-cell foam panel, for example from 40% to 50%, from 50% to 60%, from 60% to 70% or from 70% to 80% of the surface area of the solid open-cell foam panel.

As discussed above, the internal voids may contain reinforcing structures as required to maintain the strength and rigidity of the panels and/or to maintain the shape of the internal voids (e.g. where the internal voids are under partial vacuum). Suitable reinforcing structures may include reinforcing bars or posts which may, for instance, be formed from metal or from a solid-open-cell foam material.

As discussed above, the composite material panel of this aspect of the invention may comprise one or more additional layers associated with the solid open-cell foam panel and the layer of sheet-form polymeric material. The additional layers may be selected from:
(i) one or more additional foam layers, for instance one or more solid open-cell foam layers having an internal void in accordance with the first aspect of the invention, or other types of foam layers as discussed above;
(ii) one or more additional layers of sheet-form polymeric material, as discussed above;
(iii) one or more reinforcing layers, as discussed above; and
(iv) one or more fire retardant layers, as discussed above.

In a third aspect, the present invention provides a composite material panel comprising: (i) a first layer of a sheet-form polymeric material; and (ii) a first insulating layer comprising a first solid open-cell foam panel, wherein the solid open-cell foam panel is provided with an air-tight sealing coating forming a hermetic seal surrounding the open-cell foam panel.

In accordance with this aspect of the invention, the solid open-cell and/or the sheet-form polymeric material foam may be as described above.

The interior of the solid open-cell foam panel is preferably evacuated so as to form a partial vacuum within the air-tight sealing coating. For instance, the interior of the solid open-cell foam panel may desirably have an internal pressure of from 10,000 to 95,000 kPa, for example 20,000 to 80,000 kPa.

The solid open-cell foam panel may contain air or an inert gas within the air-tight sealing coating, either at or around atmospheric pressure, or under a partial vacuum as described above. Examples of inert gases which may be introduced into the solid open-cell foam panel include nitrogen, helium, neon, argon, krypton and xenon. Preferably, the inert gas is nitrogen.

It is also envisioned that other materials, preferably gaseous materials, could be introduced into the solid open-cell foam within the air-tight sealing coating, for instance fire retardants such as haloalkane gases (known as halons).

The air-tight sealing coating preferably comprises or consists of one or more elastomers, more preferably one or more elastomers as described above.

In accordance with this aspect of the invention, the air-tight sealing coating preferably penetrates at least a portion of the solid open-cell foam. For example, the air-tight sealing coating may penetrate the solid open-cell foam to a depth which is at least equivalent to the average cell diameter of the foam, more preferably to a depth which is at least two times the average cell diameter of the foam. Alternatively, the air-tight sealing coating may penetrate the solid open-cell foam to a depth of at least 0.5 mm, more preferably at least 1.0 mm, and still more preferably at least 2.0 mm, for example 2.5 mm or 3.0 mm.

In accordance with this aspect of the present invention, the solid open-cell foam panel may optionally be partitioned into a plurality of chambers, wherein each chamber is individually provided with an air-tight sealing coating. Preferably, the plurality of insulating layer chambers extend substantially across the entire first insulating layer, such that there is an air-tight seal formed between edges of adjacent insulating chambers. For instance, the air-tight sealing coating may extend between abutting edges of the insulating layer chambers. In this way, if the air-tight sealing coating of one insulating layer chamber is compromised, for example by being penetrated by a nail or through cutting the layered composite material to the required size, the insulation effect is only lost in respect that insulating layer chamber.

Preferably, each chamber is manufactured separately and an array of chambers is bonded together in a two-dimensional array to form a panel structure.

In accordance with this aspect of the invention, the layered composite material panel may further comprise a second layer of a sheet-form polymeric material, such that the solid open-cell foam panel is sandwiched between first and second layers of sheet-form polymeric material. The first and second layers of sheet-form polymeric material may be the same or different. Preferably, the second layer of sheet-form polymeric material comprises a thermosetting polymer matrix as defined above, an optionally reinforcement as defined above. For example, the second layer of sheet from polymeric material may comprise SMC as defined above. Thus, in one embodiment, this aspect of the invention relates to a three layer composite wherein the solid open-cell foam panel is sandwiched between outer layers of sheet-form polymeric material, for example SMC.

As discussed above, other arrangements of layers are also possible. For instance, the composite material may include one or more further layers of sheet-form polymeric material, one or more further insulating layers, one or more reinforcing layers, and/or one or more fire-retardant layers, as discussed above.

Thus, alternatively or in addition to reinforcement being provided as an integral part of the sheet-form polymeric material, reinforcement may be provided as a separate layer, for example arranged between the sheet-form polymeric material and the solid open-cell foam panel. As above, a separate layer of reinforcement may be coextensive with the first insulating layer, or it may be provided only in certain areas of the layered composite material where reinforcement is required.

The layered composite material panels of this aspect of the invention may further comprise one or more additional insulating layers. For example, the one or more additional insulating layers may be selected from a solid open-cell or closed-cell foam. For example, the one or more additional insulating layers may comprise a solid open-cell foam as defined above, which may optionally be provided with an air-tight sealing coating as with the first solid open-cell foam panel. Alternatively, or in addition, the one or more additional insulating layers may comprise solid open-cell foam panel in accordance with the first aspect of the invention, and/or a thermal insulating layer as defined in relation to the second aspect of the invention.

In accordance with this aspect of the invention, there is provided, in particular, a layered composite material panel wherein the first insulating layer is sandwiched between two layers of sheet-form polymeric material to form a three-layer composite material panel.

There is also provided a layered composite material panel wherein the first insulating layer and an additional insulating foam layer are sandwiched between two layers of sheet-form polymeric material to form a four-layer composite material panel.

There is further provided a layered composite material panel, wherein the first insulating layer is sandwiched between two additional insulating foam layers, and wherein the resulting assembly is sandwiched between two layers of sheet-form polymeric material to form a five-layer composite material panel.

The composite material panels of this aspect of the invention may be prepared by a method comprising the steps of:
(i) coating a solid open-cell foam with an air-tight sealing coating so as to provide a first insulating layer;
(ii) providing a first layer of sheet-form polymeric material; and
(iii) bonding the first insulating layer directly or indirectly to the sheet-form polymeric material.

In accordance with this aspect of the invention, bonding the insulating layer indirectly to the sheet-form polymeric material means that one or more intermediate layers are present between the first insulating layer and the first layer of sheet-form polymeric material. For example, a further insulating layer may be present between the first insulating layer and the first layer of sheet-form polymeric material. Thus, one or more further layers, such as a further insulating layer, may be provided, so as to form a multi-layer composite.

In preferred embodiments, the composite material panels of the above aspects of the invention may have a profiled surface. For example, the outer surface of the layered composite material may have a profiled surface formed by moulding.

Where the layered composite material panel has a profiled surface formed by moulding, the outer surface of the panel on the profiled face is preferably a sheet-form polymeric layer, such as SMC. Preferably, the sheet-form layer is adjacent to a solid open-cell foam layer, such as a solid open-cell phenolic resin foam layer, which most preferably does not have an air-tight sealing coating provided thereon.

In accordance with the above aspects of the invention, an outer surface of the sheet-form polymeric material may optionally be bonded to a surface effect material. In accordance with this aspect of the invention, the surface effect material may be selected so as to provide the layered composite material panel with, for example, a simulated stone surface, a simulated wood surface, a wood laminate surface, a material of high thermal conductivity (a "cool touch" surface), or a reflective surface. For example, a granular material, such as sand or metal granules, a veneer element, such as a wood veneer element, or a metallic foil/metallic particles can be bonded to, or partially embedded into the surface of the sheet-form polymeric material. Different surface effects can be obtained by selection of the types of surface effect materials that are used. For thermal insulation purposes, the use of a reflective surface, such as a metallic foil, is advantageous as it reduces the radiant heat absorbed by the insulating composite material panel of the invention.

In a fourth aspect, the present invention provides a composite material panel comprising: (i) a first insulating layer comprising a solid open-cell foam panel, wherein the solid open-cell foam panel is provided with an air-tight sealing coating; and (ii) one or more additional insulating layers.

In accordance with this aspect of the invention, the first insulating layer is preferably as defined in connection with the third aspect of the invention.

The one or more additional insulating layers are also preferably as defined above. Thus, the one or more additional insulating layers may be independently selected from a solid open-cell insulating foam or a solid closed-cell insulating foam. For example, the one or more additional insulating layers may comprise a solid open-cell foam as defined above, which may optionally be provided with an air-tight sealing coating, for example comprising one or more elastomers. Alternatively, or in addition, the one or more additional insulating layers may comprise an insulating layer as defined in relation to the first aspect of the invention, and/or an insulating layer as defined in relation to the second aspect of the invention.

In accordance with this aspect of the invention, the layered composite material panel may further comprise one or more additional layers selected from one or more reinforcing layers, and/or one or more fire-retardant layers, as discussed above.

Thus, reinforcement may optionally be provided as a separate layer, for example arranged between the first insulating layer and the one or more additional insulating layers. As above, a separate layer of reinforcement may be coextensive with the first insulating layer, or it may be provided only in certain areas of the layered composite material where reinforcement is required.

The composite material panel of this aspect of the invention may have a profiled surface as discussed above.

The composite material panel of this aspect of the invention may be prepared by a method comprising the steps of:
(i) coating a solid open-cell foam with an air-tight sealing coating so as to provide a first insulating layer;
(ii) providing a further insulating layer; and
(iii) bonding the first insulating layer directly or indirectly to the further insulating layer.

In accordance with this aspect of the invention, bonding the insulating layer indirectly to the further insulating layer means that one or more intermediate layers are present between the first insulating layer and the further insulating layer. Thus in accordance with this method, one or more further layers may be provided, so as to form a multi-layer composite.

In a fifth aspect, the present invention provides an insulating composite material comprising a solid open-cell phenolic resin foam, wherein the foam is provided with an air-tight sealing coating comprising an elastomer.

The solid open-cell phenolic resin foam may include a finely-divided particulate reinforcing material. Suitable particulate reinforcing materials are preferably inert and insoluble. The reinforcing material may be present in an amount of up to 10 weight percent based on the total weight of the foam, more preferably up to 5 weight percent based on the total weight of the foam. Non-limiting examples of suitable reinforcing materials include gypsum plaster and talc.

Preferably the solid open-cell phenolic resin foam has a density in the range of 100 to 500 kg·m$^{-3}$, more preferably 120 to 400 kg·m$^{-3}$ and most preferably 120 to 250 kg·m$^{-3}$.

Preferably, the average cell diameter of the solid open-cell phenolic resin foam is in the range of about 0.5 mm to 5 mm, more preferably 0.5 or 1 mm to 2 or 3 mm.

The cells or pores of the solid open-cell phenolic resin foam are open to the surface of the face on which the air-tight sealing coating is applied, and preferably they open out below the surface to a greater width than the opening, thereby providing an undercut which can enhance the keying of the air-tight sealing material to the foam.

In accordance with this aspect of the invention, the solid open-cell phenolic resin foam is preferably evacuated so as to form a partial vacuum within the air-tight sealing coating. For instance, the internal pressure within the air-tight sealing coating may be from 10,000 to 95,000 kPa, for example 20,000 to 80,000 kPa.

The solid open-cell phenolic resin foam may contain air or an inert gas within the air-tight sealing coating, either at or around atmospheric pressure, or under a partial vacuum as described above. Examples of inert gases which may be introduced into the solid open-cell phenolic resin foam include nitrogen, helium, neon, argon, krypton and xenon. Preferably, the inert gas is nitrogen.

The air-tight sealing coating preferably comprises or consists of one or more elastomers. Preferably, the air-tight sealing coating comprises or consists of at least one elastomer as defined above.

In accordance with this aspect of the present invention, the air-tight sealing coating preferably penetrates at least a portion of the solid open-cell phenolic resin foam. For example, the air-tight sealing coating may penetrate the solid open-cell foam to a depth which is at least equivalent to the average cell diameter of the foam, more preferably to a depth which is at least two times the average cell diameter of the foam. Alternatively, the the air-tight sealing coating may penetrate the solid open-cell foam to a depth of at least 0.5 mm, more preferably at least 1.0 mm, and still more preferably at least 2.0 mm, for example 2.5 mm or 3.0 mm.

In accordance with this aspect of the present invention, the insulating composite material is preferably in layer form. The layer form insulating composite material may optionally be partitioned into a plurality of chambers, wherein each chamber is individually provided with an air-tight sealing coating. Preferably, the plurality of chambers are aligned adjacent to each other such that an air-tight seal is formed between the edges of adjacent chambers. For instance, the air-tight sealing coating may extend between the edges of adjacent chambers. In this way, if the air-tight sealing coating of one insulating layer chamber is compromised, for example by being penetrated by a nail or through cutting the layered composite material to the required size, the insulation effect is only lost in respect that chamber. Preferably, each chamber is manufactured separately and an array of chambers is bonded together in a two-dimensional array to form a layer structure.

In accordance with this aspect, the present invention also provides a method of forming a composite material comprising applying an air-tight sealing coating comprising an elastomer to a solid open-cell phenolic resin foam.

In accordance with this aspect of the invention, the solid open-cell phenolic resin foam is preferably as defined above.

In the composite material panels of the invention which comprise a number of layers, the layers may be joined together in a variety of ways. For instance, where air-tight sealing coating material comprising an elastomer is used, the same coating material may be used to bond the first insulating layer to one or more adjacent layers of the layered composite material panel. Alternatively, or in addition, where a sheet-form polymeric material comprising a curable material is used, the sheet-form polymeric material may be bonded to one or more adjacent layers during curing of the sheet-form polymeric material, for instance using heat and/or pressure. In addition, a variety of known adhesives may be used to bond the individual layers of the layered composite material panel together.

Preferably, pressure is applied to the layered composite material during the bonding step so as to ensure good adhesion of the layers. As noted above, where one or more layers comprises a curable polymeric material, for example an SMC layer, the application of pressure may also assist in the curing of the curable polymer.

In accordance with the above aspects of the invention, the individual layers of layered composite material panels are preferably coextensive with each other. However, it is not excluded that in certain embodiments the various layers of the layered composite material panels may differ in extent.

For example, the first insulating layer may extend beyond the surface area of one or more other layers of the layered composite material and/or one or more other layers of the layers of the layered composite material may extend beyond the first insulating layer.

The composite material panels of the invention may be formed in a large surface area, or continuous configuration, and subsequently cut to the required size. However, unless the first insulating layer contains a plurality of internal voids, or comprises a plurality of chambers each having an air-tight sealing coating, the effect of any inert gas or vacuum contained within the air-tight sealing coating is lost. Alternatively, the composite material panels may be custom fabricated with the required dimensions for a particular application.

In one embodiment, the composite material panels of the invention may be provided in the form of modular panels, wherein each panel is provided with interconnecting means to allow a series of panels to be interconnected. In a preferred embodiment, the interconnecting means is a tongue and groove arrangement.

As noted above, in aspects of the present invention, a suitable solid open-cell foam is a solid open-cell phenolic resin foam. A particularly suitable foam may be produced by way of a curing reaction between:
(a) a liquid phenolic resole having a reactivity number (as defined below) of at least 1; and
(b) a strong acid hardener for the resole; optionally in the presence of:
(c) a finely divided inert and insoluble particulate solid which is present, where used, in an amount of at least 5% by weight of the liquid resole and is substantially uniformly dispersed through the mixture containing resole and hardener;
the temperature of the mixture containing resole and hardener due to applied heat not exceeding 85° C. and the said temperature and the concentration of the acid hardener being such that compounds generated as by-products of the curing reaction are volatilised within the mixture before the mixture sets such that a foamed phenolic resin product is produced.

By a phenolic resole is meant a solution in a suitable solvent of an acid-curable prepolymer composition prepared by condensation of at least one phenolic compound with at least one aldehyde, usually in the presence of an alkaline catalyst such as sodium hydroxide.

Examples of phenols that may be employed are phenol itself and substituted, usually alkyl substituted, derivatives thereof, with the condition that that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required. However, in this case the degree of cross-linking of the cured phenolic resin foam will be reduced. Phenol itself is generally preferred as the phenol component for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active hydrogen atoms (dihydric compound) that will react with the phenol/aldehyde reaction product of the resole during the curing step to reduce the density of cross-linking. Preferred dihydric compounds are diols, especially alkylene diols or diols in which the chain of atoms between the hydroxy groups contains not only methylene and/or alkyl-substituted methylene groups but also one or more heteroatoms, especially oxygen atoms. Suitable diols include ethylene glycol, propylene glycol, propane-1,3-diol, butane-1,4-diol and neopentyl glycol. Particularly preferred diols are poly-, especially di-,(alkylene ether) diols, for example diethylene glycol and, especially, dipropylene glycol.

Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between OH groups.

The resole may comprise a solution of the phenol/aldehyde reaction product in water or in any other suitable solvent or in a solvent mixture, which may or may not include water.

Where water is used as the sole solvent, it is preferably present in an amount of from 15 to 35% by weight of the resole, preferably 20 to 30%. Of course the water content may be substantially less if it is used in conjunction with a cosolvent, e.g. an alcohol or one of the above-mentioned dihydric compounds where used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids. The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5 to 20 poises. Below 5 poises, the amount of solvent present tends to present difficulties during the curing reaction.

The curing reaction is exothermic and will therefore of itself cause the temperature of the mixture containing resole and acid hardener to increase. The temperature of the mixture may also be raised by applied heat, but the temperature to which said mixture may then be raised (that is, excluding the effect of any exotherm) preferably does not exceed 85° C. If the temperature of the mixture exceeds 85° C. before addition of the hardener, it is usually difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range usually depends to some extent on the nature of the particulate solid, where used. For most solids the preferred temperature range is from 25 to 65° C., but for some solids, in particular wood flour and grain flour, the preferred temperature range is 25 to 75° C. The most preferred temperature range is 30 to 50° C. Temperatures below ambient, e.g. down to 10° C. can be used if desired, but no advantage is usually gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition, but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of hardener required to give substantially the same curing time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

By suitable control of the temperature and of the hardener concentration, the time lapse between adding the hardener to the resole and the composition becoming hard (referred to herein as the curing time) can be varied at will from a few seconds to up to an hour or even more, without substantially affecting the density and cell structure of the product.

Another factor that controls the amount of hardener required can be the nature of the inert solid, where present. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily formaldehyde and/or water, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. To achieve the desired effect, the solid should be present in an amount of not less than 5% by weight based on the weight of the resole.

Any finely divided particulate solid that is insoluble in the reaction mixture is suitable, provided it is inert. Examples of suitable particulate solids are provided above.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

Other additives may be included in the foam-forming mixture; e.g. surfactants, such as anionic materials e.g. sodium salts of long chain alkyl benzene sulfonic acids, non-ionic materials such as those based on poly(ethyleneoxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols. Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof. The foam-forming compositions may also contain dehydrators, if desired.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc. Conventional blowing agents may also be included to enhance the foaming reaction, e.g. low boiling organic compounds or compounds which decompose or react to produce gases.

The SMC may be prepared by applying a layer of a resin paste, for example a polyester resin paste, containing additives where appropriate, onto a bottom film carrier. Glass fibres as the reinforcement are then applied to the upper surface of the resin paste on the film carrier. A further layer of the resin paste is applied to sandwich the fibres between the layers of matrix. A top film is applied to the upper layer of the matrix. The resulting layered composition is subsequently compressed using a series of rollers to form a sheet of the sheet moulding compound between the film carriers. The material is rolled onto rollers and kept for at least 3 days at a regulated temperature of for example 23 to 27° C. The resulting SMC can be compression moulded with heat. The shelf life of the SMC before use is usually a few weeks.

Where the first insulating layer has one or more internal voids, the layer may be fabricated in a low-pressure environment, such that a partial vacuum is formed within the void, and/or in the presence of an inert gas.

Similarly, where the solid open-cell foam has an air-tight sealing coating, the air-tight sealing coating may optionally be provided in a low-pressure environment, such that a partial vacuum is formed within the air-tight sealing coating, and/or in the presence of an inert gas.

Alternatively, the air-tight sealing coating surrounding the internal void or the solid open-cell foam may be penetrated by a connector port, which may be connected to a vacuum source and/or a source of inert gas or other gas (e.g. fire retardant gas). The connector port is preferably sealable once a vacuum is formed within the air-tight sealing coating, or once the inert gas or other gas fills the solid open-cell foam within the air-tight sealing coating.

Where a vacuum is formed within the air-tight sealing coating, the connector port is preferably a one-way gas valve, such that an air tight seal is automatically formed following application of a vacuum. Alternatively, a two-way gas valve may be used so as to enable the internal void or the solid open-cell foam within the air-tight sealing coating to be repeatedly flushed and evacuated, for instance to enable an inter gas to be introduced into the internal void or foam.

Thus, the vacuum, inert gas or other material may be provided separately to individual panels fitted with connector ports (such as one-way gas valves in the case of a vacuum) during manufacture of the layered composite material panel. Alternatively, the vacuum, inert gas or other material may be provided separately to individual panels during installation of the panels, for instance in a building. As a further alternative, the vacuum, inert gas or other material may be provided to a number of panels at once. For instance, the connector ports of a plurality of panels may be connected in series or in parallel, preferably in parallel, to a vacuum source or a source of inert gas or other gas. The series or parallel connection between the connector ports of the plurality of panels may be removed once the vacuum or gas has been provided, or may be left in situ to enable subsequent replenishment of the vacuum or gas, e.g. where the air-tight sealing coating may be susceptible to gradual permeation of gases into and/or out of the solid open-cell foam or internal void.

In a further preferred embodiment, the composite material panels of the invention are provided with means for monitoring the internal pressure of a panel or of a plurality of panels connected in series or in parallel. In this way, any gradual loss of partial vacuum in the internal voids or in the solid open-cell foam within the air-tight sealing coating can be monitored and the vacuum can be reapplied as required, for instance via a connector port, so as to maintain the thermal insulating properties of the panels.

In a further preferred embodiment, a vacuum source, such as a vacuum pump, may be associated with a panel or plurality of panels according to the invention so as to reapply the vacuum as required. In a further preferred embodiment, the vacuum source may also be associated with means for monitoring the internal pressure of a panel or plurality of panels, such that reapplication of the vacuum as required may be automated. In this regard, it is noted that the potential energy savings due to the thermal insulating properties of the composite material panels according to the invention far outweigh the cost of monitoring any loss of vacuum and reapplying the vacuum where necessary.

To improve the rigidity of the composite material panels of the invention, the composite material panels may be mounted in a frame or by frame members such as stiles, rails, and/or mullions. The frame members may be of wood, metal (for example, aluminium), or plastics (such as UPVC), or a combination of these.

In one embodiment, the composite material panels of the invention may occupy substantially the entire volume or volume within the frame, such that frame members abut the edges of the composite material panels. In another embodiment, substantially the entire volume or volumes within the frame are occupied by the first insulating layer, and optionally one or more additional layers, and at least one further layer overlies substantially the entire surface of the frame and the layers contained therein. It will be appreciated that the use of frame members, particularly metal frame members, compromises the insulating capability of the layered composite materials of the invention. Thus, the use of frame members is ideally kept to the minimum necessary to obtain the necessary structural rigidity of the composite material panels of the invention.

The composite material panels of the invention may be formed in a large surface area, or continuous configuration, and subsequently cut to the required size. However, unless the first insulating layer is sub-divided into a plurality of chambers, each chamber having an air-tight sealing coating, the effect of any inert gas or vacuum contained within the air-tight sealing coating is lost. Alternatively, the composite material panels may be custom fabricated with the required dimensions for a particular application.

In one embodiment, the composite materials of the invention may be provided in the form of modular panels, wherein each panel is provided with interconnecting means to allow a series of panels to be interconnected. In a preferred embodiment, the interconnecting means is a tongue and groove arrangement.

Where the composite material comprises more than three layers, the tongue and groove arrangement may be obtained by offsetting one or more central layers relative to two or more outer layers. The offset may be linear or diagonal. Where the offset is linear, the composite material modular panels may be connected in a two-dimensional array. Where the offset is diagonal, the composite material modular panels may be connected in a three-dimensional array.

Alternatively, or where the composite material comprises fewer than three layers, the tongue and groove arrangement may be obtained by contouring the edges of the individual layers of the composite material. Where the tongue and groove arrangement is provided on two opposite edges of the composite material modular panels, the panels may be connected in a two-dimensional array. Where the tongue and groove arrangement is provided on all edges of the composite material modular panels, the panels may be connected in a three-dimensional array.

Where a tongue and groove arrangement is used, the tongue and/or groove portions may comprise means for maintaining the integrity of the tongue and groove joint. For example, the tongue and/or groove portions may be provided with a gripping surface, such as a rubberised coating. Alternatively, the tongue and/or groove portions may be provided with a contact adhesive.

The composite material panels of the invention may be used for a wide variety of applications where the transfer of heat and is undesirable.

In one aspect of the invention, the composite material panels of the invention may be used as construction materials, for instance to clad buildings, as cavity wall insulation, roof insulation, or as underfloor insulation. Depending on their construction, the panels may also be used as structural elements in their own right, for instance as wall panels, floorboards, or roofing panels. For instance, the panels may be used in the manufacture of prefabricated buildings and mobile homes.

In another aspect of the invention, the composite material panels of the invention may be used in the construction of insulated doors. In one embodiment, the composite material panels of the invention may be used as insulating inserts between the outer surfaces of a door leaf. Alternatively, the composite material panels of the invention may be used to form doors in their own right. For instance, the profiled surfaces found on many types of doors may be formed by the moulding processes described above.

In yet another aspect of the invention, the composite materials of the invention may be used in the construction of window frames, for example, metal (e.g. aluminium or steel), wood or plastic (e.g. UPVC) window frames. In a preferred embodiment, the composite materials may be used to provide an insulating layer located between inner and outer surfaces of a window frame, and/or around the periphery of a window pane, e.g. a double-glazed window pane.

Exemplary of window frames which may be provided with composite materials according to the invention are those having inner and outer frame surfaces, which may each be formed of the same or different materials, for example metal (e.g. aluminium or steel), wood or plastic (e.g. UPVC). The inner and outer frame surfaces may be joined directly to each other, for example where they are formed of a low thermal conductivity material, such as a plastics material. Alternatively, the frame surfaces may be joined by an intermediate connecting member formed from a thermally insulating material (a "thermal break") to prevent conductive heat transfer across the window frame, for example where the frame surfaces are formed of metal (a good thermal conductor). Suitable thermally insulating materials include plastics, such as polyamides (e.g. nylon).

Within the window frame structure there are typically one or more hollow chambers located between the inner and outer frame surfaces, these chambers conventionally act as insulating zones to restrict loss of heat across the window frame.

In accordance with this aspect of the present invention, a composite material as defined above is located between the inner and outer frame surfaces. Where there are one or more hollow chambers located between the inner and outer frame surfaces, the composite material is preferably located within one or more of the hollow chambers.

The composite material panels of the invention may also be used in the construction of insulated heating systems, refrigerated rooms, refrigerated containers, refrigerated vehicles, and for the insulation of hot water tanks, swimming pools, and pipes.

In another embodiment, the present invention provides a composite structure comprising: (i) a metal surface having a powder coating; and (ii) an insulating layer comprising a solid open-cell phenolic resin foam.

As used herein, the term powder coating refers to a coating that is applied to the metal surface as a free-flowing dry powder then cured under heating and optionally pressure to form a flowable material which forms a skin on the metal surface. The powder may be a thermoplastic or thermosetting polymer and generally forms a hard finish which is tougher than conventional paint coatings. Such coatings and methods for their application are well-known to persons of skill in the art.

The metal used to make the metal surface is not particularly limited, and examples include aluminium and steel. In many applications a lightweight metal is desirable, in which case aluminium may be preferred.

The phenolic resin is preferably as described above, and is preferably formed in accordance with the methods described above. Preferably the phenolic resin is devoid of an air-tight sealing coating.

One advantage of the composite structures of the invention is that the powder coating may be applied and cured with the insulating layer in situ without impairing the structure or the insulating properties of the solid open-cell phenolic resin foam insulating layer. In prior art composite structures, the insulating materials cannot withstand the temperatures and pressures required to cure the powder coating. Accordingly, such structures must be assembled in a stepwise manner in which the powder coating is first applied to the metal surface and cured in the absence of the insulating materials. The insulating materials are subsequently incorporated into the composite structures in a subsequent step, adding complexity to the construction process.

Examples of composite structures in accordance with this aspect of the invention include doors, window frames and vehicle bodywork panels.

Thus, in accordance with this aspect of the invention, a door is provided having at least one powder coated metal surface and an insulating layer of a solid open-cell phenolic resin foam provided in a cavity within the door as an insulating layer. For example, the door may be constructed from a frame and a metal skin covering the two major faces of the frame so as to form the door surfaces, wherein the solid open-cell phenolic resin foam is located in one or more voids between the frame and the metal skin as an insulating layer.

The powder coating may be applied to the metal surface of the door with the phenolic resin foam in situ without impairing the structure or insulating properties of the insulating layer.

Also in accordance with this aspect of the invention, a window frame is provided having inner and outer window frame surfaces, in which the inner and/or outer window frame surfaces are made of powder-coated metal, such as aluminium or steel, and a solid open-cell phenolic resin foam is located between the inner and outer window frame surfaces.

In a preferred embodiment, the open-cell phenolic resin foam is located in one or more hollow chambers located between the inner and outer frame surfaces.

The powder coating may be applied to the inner and/or the outer window frame surface with the phenolic resin foam in situ without impairing the structure or insulating properties of the insulating layer.

In a further aspect, the present invention provides a method of preparing a composite structure comprising: (i) a metal surface having a powder coating; and (ii) an insulating layer comprising a solid open-cell phenolic resin foam, said method comprising applying and curing the powder coating in the presence of the solid open-cell phenolic resin foam.

Preferably, the powder coating is cured at a temperature in the range of from 100 to 250° C., more preferably 120 to 220° C.

In accordance with this aspect of the invention, the method may be used to prepare the composite structures described above.

Preferred features of the present invention will now be described, purely by way of example, with reference to the accompanying drawings, in which:

FIG. 1 shows a schematic cross-sectional view of a composite material panel according to the first aspect of the invention. The panel comprises a solid open-cell foam panel (10) which is formed from a first solid open-cell foam panel (10A) and a second solid open-cell foam panel (10B). The first and second solid open-cell foam panels (10A, 10B) are each provided with complementary recesses which define internal voids (12A, 12B), the peripheral surfaces of which are provided with an air-tight sealing coating (14A, 14B).

Figure 2:
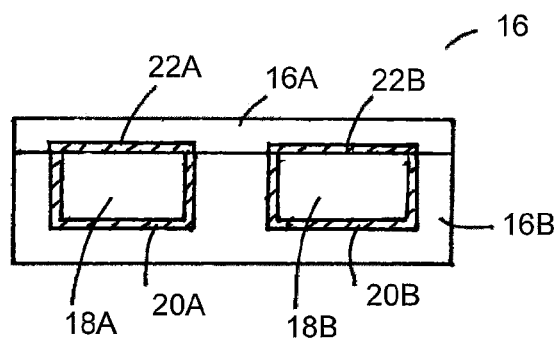

FIG. 2 shows a schematic cross-sectional view of an alternative embodiment of a composite material panel according to the first aspect of the invention. The panel comprises a solid open-cell foam panel (16) which is formed from a first solid open-cell foam panel (16A) and a second solid open-cell foam panel (16B). The first solid open-cell foam panel (16A) has substantially planar surface adjacent to the second solid open-cell foam panel (16B) which is provided with recesses which define internal voids (18A, 18B). The peripheral surfaces of the internal voids (18A, 18B) are provided with an air-tight sealing coating (20A, 20B, 22A, 22B).

Figure 3:
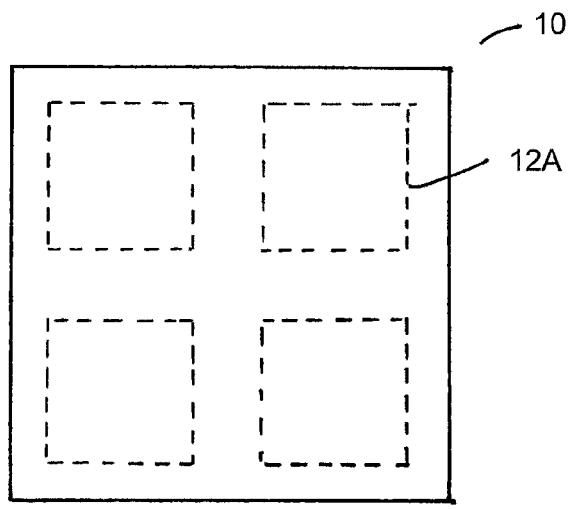

FIG. 3 shows a schematic plan view of a composite material panel according to the first aspect of the invention as shown in FIG. 1. The location of internal voids (12A) is shown in outline. It will be appreciated that FIG. 3 can equally represent the embodiment of the panel shown in FIG. 2.

Figure 4:
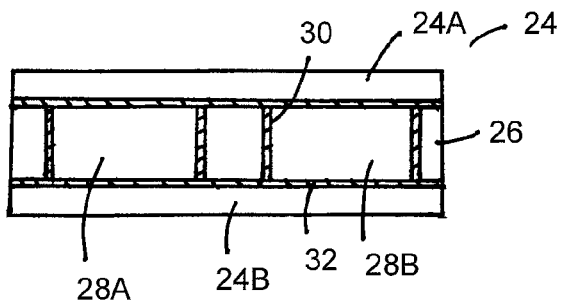

FIG. 4 shows a schematic cross-sectional view of a further alternative embodiment of a composite material panel according to the first aspect of the invention. The panel comprises a solid open-cell foam panel (24) which is formed from a first solid open-cell foam panel (24A) and a second solid open-cell foam panel (24B). The first and second solid open-cell foam panels (24A,24B) are separated by rails (26) and stiles (not shown) so as to define internal voids (28A, 28B). The peripheral surfaces of the internal voids (28A, 28B) are provided with an air-tight sealing coating (30). In the embodiment shown, the air-tight sealing coating material is provided across the entire surfaces (32) of the first and second solid open-cell foam panels (24A,24B) so as to hermetically seal the internal voids (28A,28B) and to bond the first and second solid open-cell foam panels (24A,24B) to the rails (26) and stiles.

Figure 5:
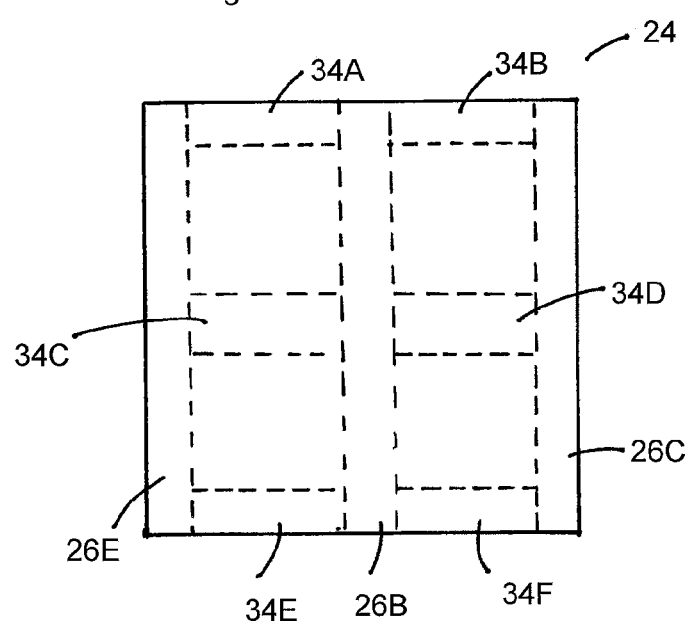

FIG. 5 shows a schematic plan view of a composite material panel according to the first aspect of the invention as shown in FIG. 4. The location of rails (26A,26B,26C) and stiles (34A,34B,34C,34D,34E,34F) are shown in outline.

Figure 6:
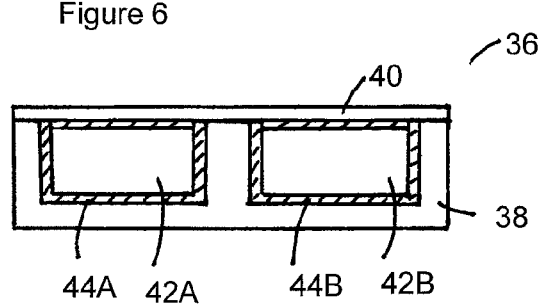

FIG. 6 shows a schematic cross-sectional view of a composite material panel according to the second aspect of the invention. The panel comprises an insulating layer (36) which is formed from a solid open-cell foam panel (38) and a layer of sheet-form polymeric material (40). The solid open-cell foam panel (38) is provided with recesses which, together with the layer of sheet-form polymeric material (40) define internal voids (42A,42B). The surfaces of the solid-open cell foam panel and the surfaces of the sheet-form polymeric material peripheral to the internal void are provided with an air-tight sealing coating (44A,44B).

Figure 7:
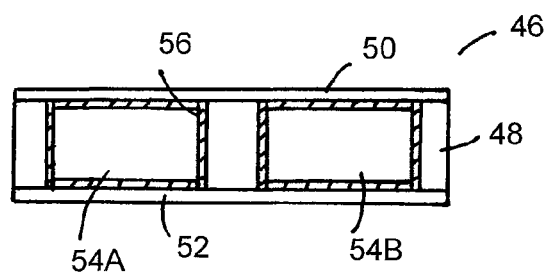

FIG. 7 shows a schematic cross-sectional view of an alternative embodiment of a composite material panel according to the second aspect of the invention. The panel comprises an insulating layer (36) which is formed from a solid open-cell foam panel (48), a first layer of sheet-form polymeric material (50) and a second layer of sheet-form polymeric material (52). The solid open-cell foam panel (48) is provided with openings which extend through the entire thickness of the panel (48). Together with the first and second layers of sheet-form polymeric material (50,52) the openings define internal voids (54A,54B). The surfaces of the solid-open cell foam panel and the surfaces of the sheet-form polymeric material peripheral to the internal void are provided with an air-tight sealing coating (56).

Figure 8:
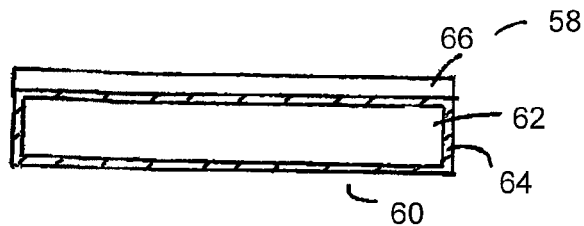

FIG. 8 shows a schematic cross-sectional view of a composite material panel (58) according to the third aspect of the invention. The panel comprises a first insulating layer (60) comprising a solid open-cell foam (62) having an air-tight sealing coating (64), and a first sheet-form polymeric material layer (66).

Figure 9:
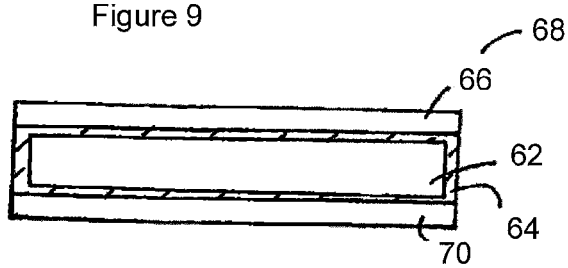

FIG. 9 shows a schematic cross-sectional view of an alternative embodiment of a composite material panel (68) according to the third aspect of the invention. As in FIG. 8, the panel comprises a first insulating layer comprising a solid open-cell foam (62) having an air-tight sealing coating (64) and a first sheet-form polymeric material layer (66). A second sheet-form polymeric material layer (70) is additionally provided on the opposite face of the first insulating layer to the first sheet-form polymeric material layer (66).

Figure 10:
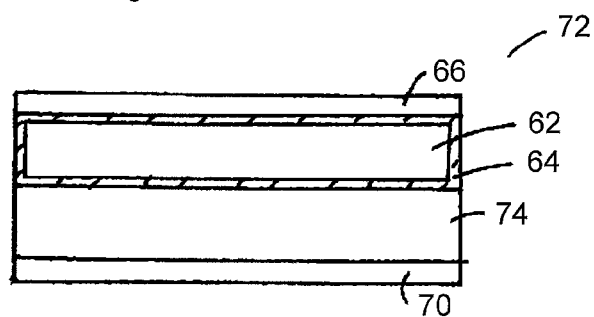

FIG. 10 shows a schematic cross-sectional view of an alternative embodiment of a composite material panel (68) according to the third aspect of the invention. As in FIG. 9, the panel comprises a first insulating layer comprising a solid open-cell foam (62) having an air-tight sealing coating (64) and first and second sheet-form polymeric material layers (66, 70). An additional insulating layer (74), such as an open-cell foam layer is provided between the first insulating layer and the second sheet-form polymeric material layer (70).

Figure 11:
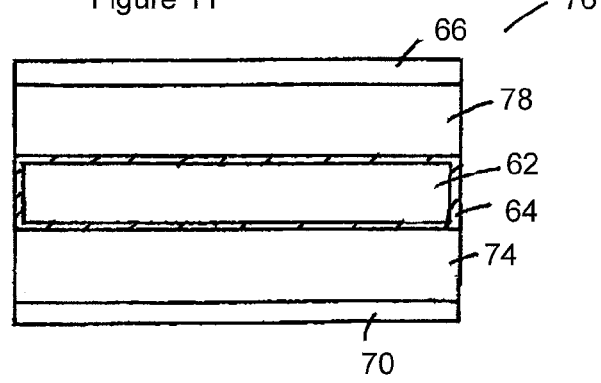

FIG. 11 shows a schematic cross-sectional view of an alternative embodiment of a composite material panel (76) according to the third aspect of the invention. As in FIG. 10, the panel comprises a first insulating layer comprising a solid open-cell foam (62) having an air-tight sealing coating (64), first and second sheet-form polymeric material layers (66, 70) and an additional insulating layer (74). A further additional insulating layer (78) is provided between the first insulating layer and the first sheet-form polymeric material layer (66).

Figure 12:
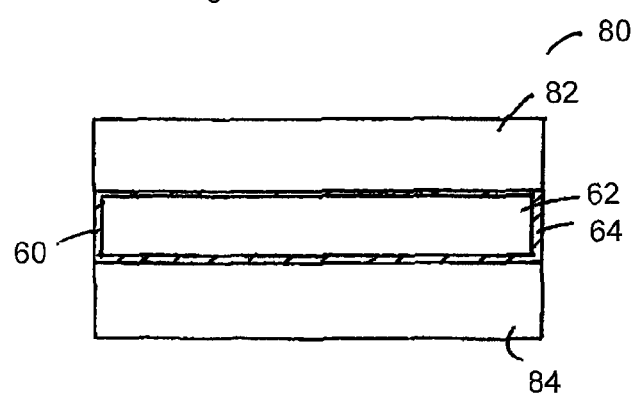

FIG. 12 shows a schematic cross-sectional view of a composite material panel (80) according to the fourth aspect of the invention. The panel comprises a first insulating layer (60) comprising a solid open-cell foam (62) having an air-tight sealing coating (64). Additional insulating layers (82,84) are provided on opposite faces of the first insulating layer (60).

Figure 13:
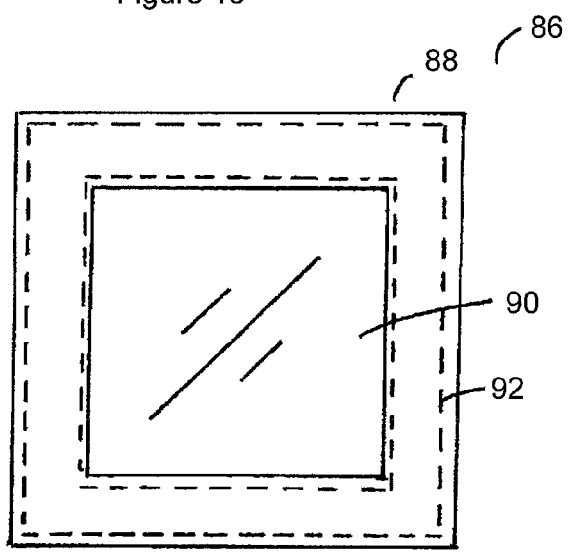

FIG. 13 shows a schematic plan view of a window (86) comprising composite material panel according to the present invention as insulation. A window frame (88) is shown surrounding a window pane (90), e.g. a double-glazed window pane. The location of the composite material (92) is shown in outline.

Figure 14:
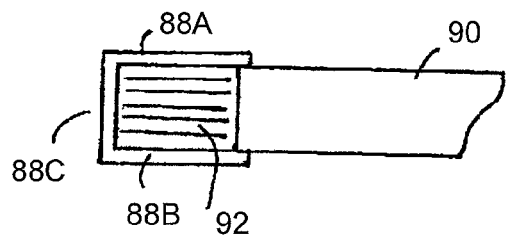

FIG. 14 shows a schematic cross sectional view of a portion of a window (86) as shown in FIG. 13. The window frame (88) comprises an inner frame surface (88A) and an outer frame surface (88B) joined by an outer edge (88C). A void space between the inner and outer frame surfaces (88a,88B) and the outer edge (88C) is provided with a composite material according to the present invention (92).

Figure 15:
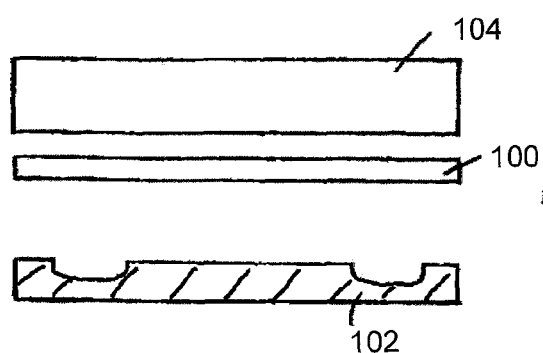
Figure 16:
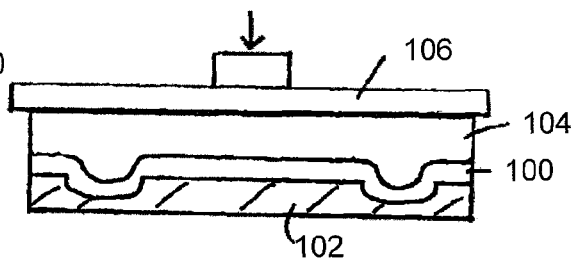
Figure 17:
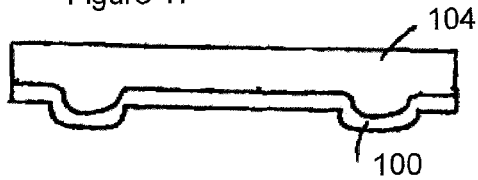

As shown in FIGS. 15 to 17, a profiled surface of the layered composite material panels of the invention may be formed by a moulding process. In FIGS. 15 to 17, the moulding process is shown by reference to the composite materials the third aspect of the invention, although it will be appreciated that the same process may also be applied to form composite materials according to the other aspects of the invention having a contoured surface.

Thus, a layer of sheet-form polymeric material (100), preferably SMC, is applied to the upper surface of a mould (102). The sheet-form polymeric material (100) is preferably sized so as to extend across the whole of the mould surface. Onto the sheet-form polymeric material (100) is applied a solid open-cell foam foam layer (104). The foam used is advantageously:

structural and has load bearing properties;
frangible and can be formed under pressure;
inelastic, such that it substantially retains its pressed form; and
open cell such that gases may escape from the foam matrix during pressing and such that curable materials in the sheet-form polymeric material can migrate into the open cells of the foam so as to form a strong bond between the sheet-form polymeric material and the foam.

Downward pressure is applied to the components as shown in FIG. 16 using a pressure plate (106). The foam layer (104) is pressed toward the lower mould surface (102), crushing the foam and moulding the lower surface of the foam (104) to the shape of the mould surface (102). The sheet-form polymeric material (100) is also pressed between the mould surface and the foam layer (104). Where SMC is used as the sheet-form polymeric material, the mould surface is preferably heated. Under action of the pressing member, the SMC begins to liquefy and flows into cells at the surface of the foam.

Air and other gases trapped between the sheet-form polymeric material (100) and the foam layer (104) pass through the open cell structure of the foam. The components are held in the mould with the application of pressure for a sufficient time for the formation of a bond between the layers, e.g. the curing time of the SMC. The resulting product is then removed from the mould as shown in FIG. 17, and may subsequently be bonded to a first insulating layer as described above.

Figure 18:
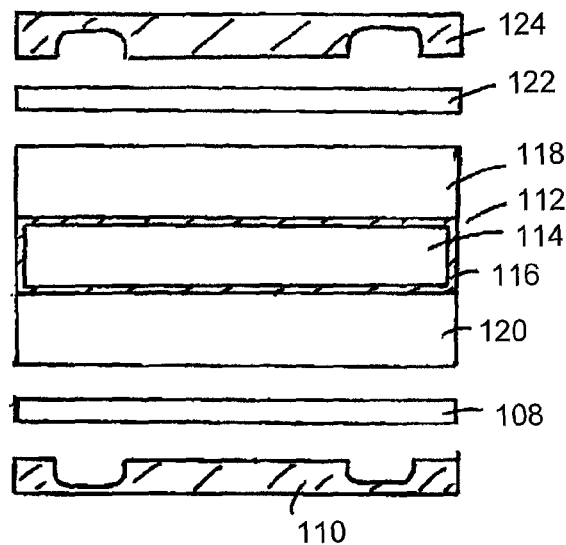
Figure 19:
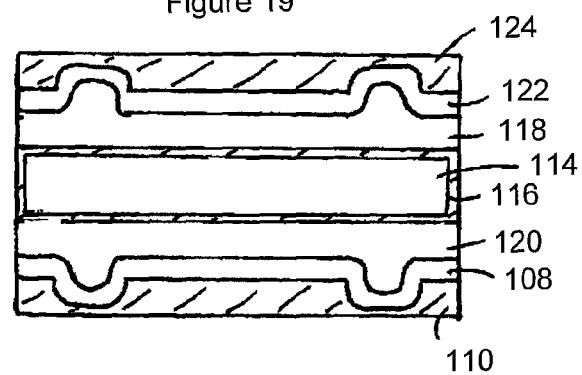
Figure 20:
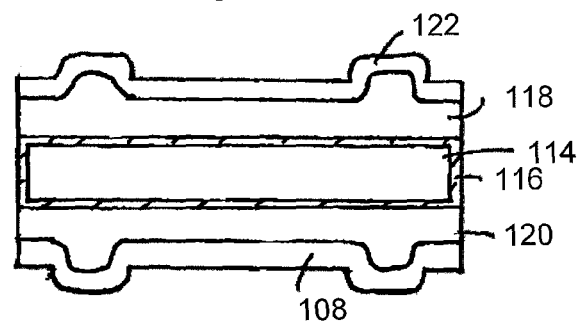

As shown in FIGS. 18 to 20, layered composite material panels of the invention having a profiled surface on both faces may also be formed by a moulding process. Thus, a layer of sheet-form polymeric material (108), preferably SMC, is applied to the upper surface of a mould (110). The sheet-form polymeric material (108) is preferably sized so as to extend across the whole of the mould surface. Onto the sheet-form polymeric material (108) is applied a three layer composite panel comprising a first insulating layer (112) comprising a solid open cell foam (114) having an air-tight sealing coating (116). The first insulating layer (112) sandwiched between two additional insulating foam layers (118, 120). As above, the additional insulating foam layers (118, 120) are advantageously:

structural and have load bearing properties;
frangible and can be formed under pressure;
inelastic, such that they substantially retain their pressed form; and
open cell such that gases may escape from the foam matrix during pressing and such that curable materials in the sheet-form polymeric material can migrate into the open cells of the foam so as to form a strong bond between the sheet-form polymeric material and the foam.

A further layer of sheet-form polymeric material (122), preferably SMC, is applied to the upper surface of the insulating foam layer (118), and a second mould (124) is disposed above the sheet-form polymeric material (122).

Downward pressure is applied to the components as shown in FIG. 19 using a pressure plate (not shown). The foam layer (120) is pressed toward the lower mould surface (110), crushing the foam and moulding the lower surface of the foam (120) to the shape of the mould surface (110). The sheet-form polymeric material (108) is also pressed between the mould surface (110) and the foam layer (120). Simultaneously, the foam layer (118) is pressed toward the upper mould surface (124), crushing the foam and moulding the upper surface of the foam (118) to the shape of the mould surface (124). The sheet-form polymeric material (122) is also pressed between the mould surface (124) and the foam layer (118). Preferably, the foam layers (118, 120) are selected such that crushing of the foam is progressive, such that most crushing takes place adjacent the mould surfaces. In this way, damage to the air-tight sealing coating of the first insulating layer, and therefore compromise of the air-tight seal, is avoided.

As above, air and other gases trapped between the sheet-form polymeric materials (108,122) and the foam layers (118,120) pass through the open cell structure of the foam layers. The components are held in the mould with the application of pressure for a sufficient time for the formation of a bond between the layers, e.g. the curing time of the SMC. The resulting product is then removed from the mould as shown in FIG. 20.

Figure 21:
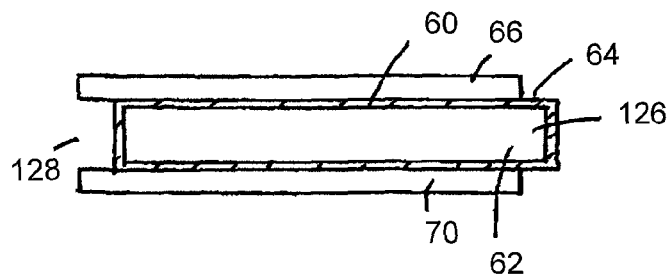
Figure 22:
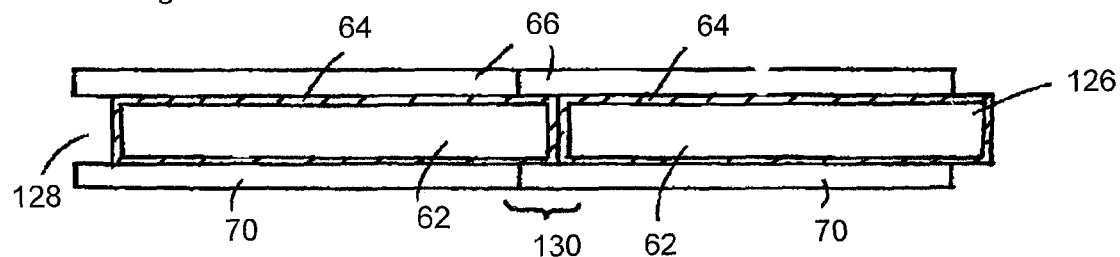
Figure 23:
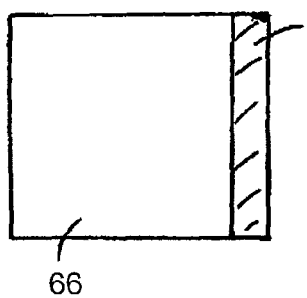
Figure 24:
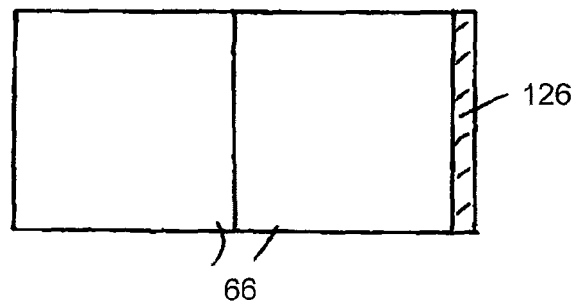
Figure 25:
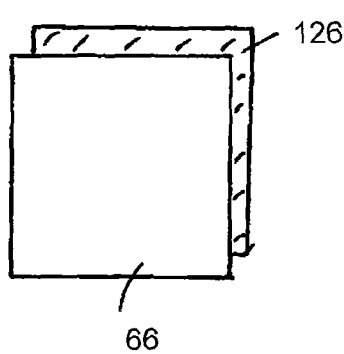
Figure 26:
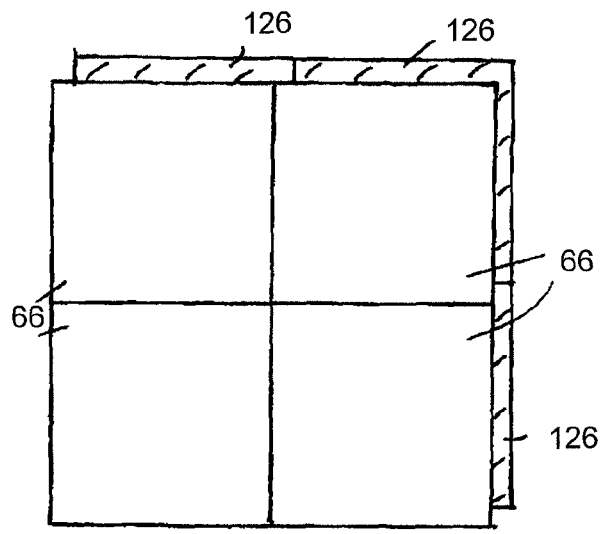

FIG. 21 represents the composite material of FIG. 9, wherein the first insulating layer (60) is offset relative to the sheet-form polymeric material layers (66, 70) so as to form a tongue portion (126) and a groove portion (128). The tongue and groove portions allow a series of panels to be joined together by way of a tongue and groove joint (130), as shown in FIG. 22. The offset may be linear, as shown in FIG. 23, such that a two-dimensional array of panels may be formed, as shown in FIG. 24. Alternatively, the offset may be diagonal, as shown in FIG. 25, such that a three-dimensional array of panels may be formed, as shown in FIG. 26. Although FIGS. 21 to 26 relate to the composite material of the third aspect of the invention, it will be appreciated that the same arrangement may be used to join panels according to the other aspects of the invention.

For the avoidance of doubt, it is stated that the composite materials and methods shown in the Figures discussed above are merely exemplary and are not intended to limit the scope of the invention. Further, it will be appreciated that the various features of the composite materials and methods described herein may be provided independently or in any appropriate combination. Thus, it will be appreciated that the various layer types described herein may be combined in any combination so as to form a variety of layered composite materials, and that the various methods described herein could be combined in any appropriate order so as to form a particular product.

The invention claimed is:

1. A composite material panel comprising a first insulating layer comprising a solid open-cell foam, wherein the solid open-cell foam is a substantially rigid and self-supporting polymeric foam, wherein the panel has at least one internal void provided therein, wherein the peripheral surfaces of the internal void are provided with an air-tight sealing coating comprising at least one elastomer, and further wherein the cells of the open-cell foam are open to the peripheral surfaces of the internal void onto which the air-tight sealing coating is applied, and wherein the air-tight sealing coating is keyed to open cells of the open-cell foam.

2. The composite material panel according to claim 1, wherein the polymeric foam is selected from at least one member of a group consisting of: phenolic resin foams, polystyrene foams, polyurethane foams, polyethylene foams, polyvinylchloride foams, polyvinylacetate foams, polyester foams, polyether foams, and foam rubber.

3. The composite material panel according to claim 1, wherein the solid open-cell foam includes a finely-divided particulate reinforcing material, wherein the finely-divided particulate reinforcing material is selected from at least one member of a group consisting of: clays, clay minerals, talc, vermiculite, metal oxides, refractories, solid or hollow glass microspheres, fly ash, coal dust, wood flour, grain flour, nut shell flour, silica, mineral fibers, finely chopped glass fiber, finely divided asbestos, chopped fibers, finely chopped natural or synthetic fibers, ground plastics and resins, pigments, powdered paint, carbon black, and starches.

4. The composite material panel according to claim 1, wherein the solid open-cell foam has a density in the range of about 100 to about 500 $kg \cdot m^{-3}$.

5. The composite material panel according to claim 1, wherein the solid open-cell foam has an average cell diameter in the range of from about 0.5 mm to about 5 mm.

6. The composite material panel according to claim 1, wherein the at least one internal void is evacuated forming a partial vacuum within the internal void, wherein an internal pressure is from about 10,000 to about 95,000 kPa.

7. The composite material panel according to claim 1, wherein the at least one internal void contains at least one member of a group consisting of: air and an inert gas.

8. The composite material panel according to claim 1, wherein the elastomer of the air-tight sealing coating is selected from at least one member of a group consisting of natural rubber, synthetic polyisoprene, butyl rubber, halogenated butyl rubber, polybutadiene, styrene-butadiene rubber, nitrile rubber, hydrogenated nitrile rubber, chloroprene rubber, silicone rubber, and halogenated silicone rubber.

9. The composite material panel according to claim 1, wherein the air-tight sealing coating penetrates at least a portion of the solid open-cell foam around the periphery of the at least one internal void to a depth which is at least equivalent to the average cell diameter of the foam.

10. The composite material panel according to claim 8, wherein the air-tight sealing coating penetrates at least a portion of the solid open-cell foam around the periphery of the at least one internal void to a depth of at least 0.5 mm.

11. The composite material panel according to claim 1, wherein the at least one internal void has a cross-sectional area in the direction perpendicular to the panel thickness in the range of from about 1.0 cm² to about 10,000 cm².

12. The composite material panel according claim 1, wherein at least one additional layer is associated with the solid open-cell foam panel.

13. The composite material panel according to claim 8, wherein the polymeric foam comprises a thermosetting polymer resin matrix.

14. The composite material panel according to claim 1, further comprising one or more reinforcing layers.

15. A composite material panel comprising a first insulating layer comprising a solid open-cell foam, wherein the solid open-cell foam is a substantially rigid, self-supporting polymeric foam panel, and at least one layer of a sheet-form polymeric material, wherein at least one internal void is provided between the solid open-cell foam panel and the at least one layer of sheet-form polymeric material, wherein the surfaces of the open-call foam panel peripheral to the at least one internal void are provided with an air-tight sealing coating comprising at least one elastomer, which keys to the open-cells of the open-cell foam wherein the cells of the open-cell foam are open to the peripheral surfaces of the internal void, and wherein the sheet-form polymeric material is bonded to the solid open-cell foam panel so as to hermetically seal the at least one internal void.

16. The composite material panel according to claim 15, wherein the at least one internal void comprises a recess in a surface of the open-cell foam panel which is hermetically sealed by a layer of sheet-form polymeric material which overlies the recess and is bonded to the surface of the open-cell foam panel at least at the periphery of the recess or depression.

17. The composite material panel according to claim 15, wherein the at least one internal void comprises an opening extending through the entire thickness of the panel, and hermetically sealing the opening by bonding a first layer of sheet-form polymeric material to the surface of the open-cell foam panel on one side of the opening and bonding a second layer of sheet-form polymeric material to the surface of the open-cell foam panel on the opposite side of the opening.

18. The composite material panel according to claim 15, wherein the air-tight sealing coating penetrates at least a portion of the solid open-cell foam around the periphery of the at least one internal void to a depth which is at least equivalent to the average cell diameter of the foam.

19. The composite material panel according to claim 15, wherein the air-tight sealing coating penetrates at least a portion of the solid open-cell foam around the periphery of the at least one internal void to a depth of at least 0.5 mm.

20. The composite material panel according to claim 15, wherein the at least one internal void is evacuated so as to form a partial vacuum within the internal void.

21. The composite material panel according to claim 15, wherein the at least one internal void contains air or an inert gas.

22. The composite material panel according to claim 15, wherein the at least one internal void has a cross-sectional area in the direction perpendicular to the panel thickness in the range of from about 1.0 cm² to about 10,000 cm².

23. The composite material panel according to claim 15, wherein at least one additional layer is associated with the solid open-cell foam panel and the layer of sheet-form polymeric material.

24. A composite material panel comprising a first insulating layer comprising a solid open-cell foam, wherein the solid open-cell foam is a substantially rigid and self-supporting polymeric foam, wherein the panel has at least one internal void provided therein, wherein the peripheral surfaces of the internal void are provided with an air-tight sealing coating comprising at least one elastomer, wherein the cells of the solid open-cell foam are open to the peripheral surfaces of the internal void onto which the air-tight sealing coating is applied, and further wherein the air-tight sealing coating penetrates at least a portion of the solid open-cell foam around the periphery of the at least one internal void to a depth which is at least equivalent to the average cell diameter of the solid open-cell foam to key the air-tight sealing coating to the solid open-cell foam.

25. The composite material panel according to claim 24, wherein the average cell diameter of the solid open-cell foam is from about 0.5 mm to about 5 mm.

* * * * *